Nov. 21, 1967 — R. D. BACH — 3,353,825

BOWLING BALL

Filed Jan. 13, 1965

INVENTOR
ROBERT DREYER BACH,

BY Edwin Tocker

ATTORNEY

United States Patent Office 3,353,825
Patented Nov. 21, 1967

3,353,825
BOWLING BALL
Robert Dreyer Bach, Arlington, Mass., assignor to E. I. du Pont de Nemours and Company, Wilmington, Del., a corporation of Delaware
Filed Jan. 13, 1965, Ser. No. 425,339
7 Claims. (Cl. 273—63)

ABSTRACT OF THE DISCLOSURE

A shell/core bowling ball is made of a heavy polymeric resin core and a lighter transparent polymeric resin shell with the core so placed in the shell so that the core becomes externally invisible due to the relationship between the thickness of the shell, the size of the core, and the refractive index of the shell.

---

This invention relates to bowling balls and similar spherical objects such as duckpin balls and the like.

Generally, the materials which are available for the fabrication of bowling balls having dimensions which meet the specifications set by the American Bowling Congress (A.B.C.) are dark or at least opaque. Recent discoveries in the area of plastic resins have now made it possible to fabricate bowling balls which vary from translucent to transparent. The limitation on transparency stems mainly from the density limitation of the plastic resin employed in that the density of the transparent resin employed is insufficient to provide the requisite weight without exceeding the specification diameter for the 14–16 lb. ball weight range. The methacrylate resins have been utilized to produce transparent bowling balls of limited weights. For example, methyl methacrylate resins may be employed for the formation of bowling balls weighing up to about 14 lbs. Weights in excess of this amount have been achieved by means of an opaque core or insert of greater density than the methacrylate resin. The use of such an expedient, however, detracts from the complete transparency which is otherwise available through use of a methacrylate resin.

It is an object of the present invention, therefore, to provide bowling balls which are fabricated from methacrylate resins. It is a further object to provide methacrylate resin bowling balls which are transparent throughout. Still another object is to provide transparent methacrylate resin bowling balls meeting the American Bowling Congress size specification for the weight range of about 14 to about 16 lbs. Another object of this invention is to provide a process for the production of the aforesaid transparent bowling balls of methacrylate resin. Other objects will become apparent hereinafter.

Figure 1:
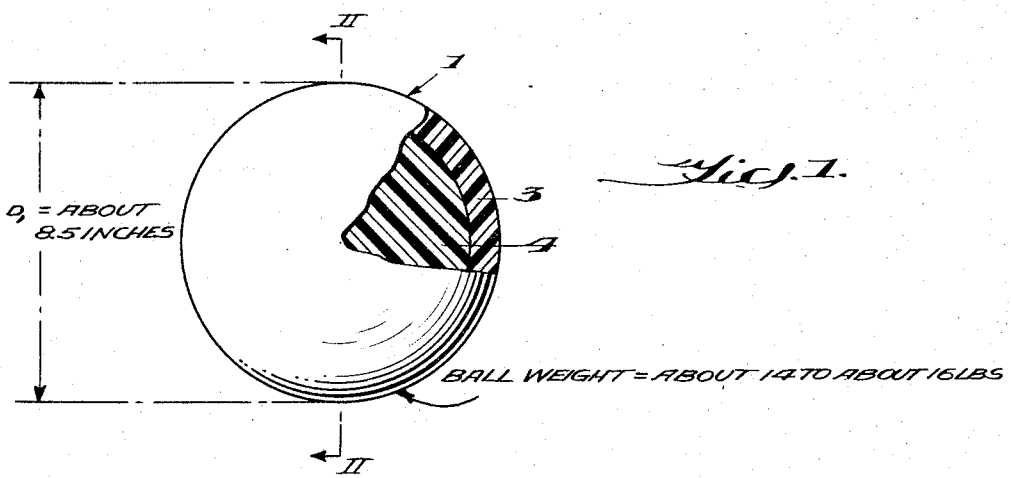
FIG. 1 shows a partially sectioned shell/core bowling ball with a normally externally invisible core.
Figure 2:
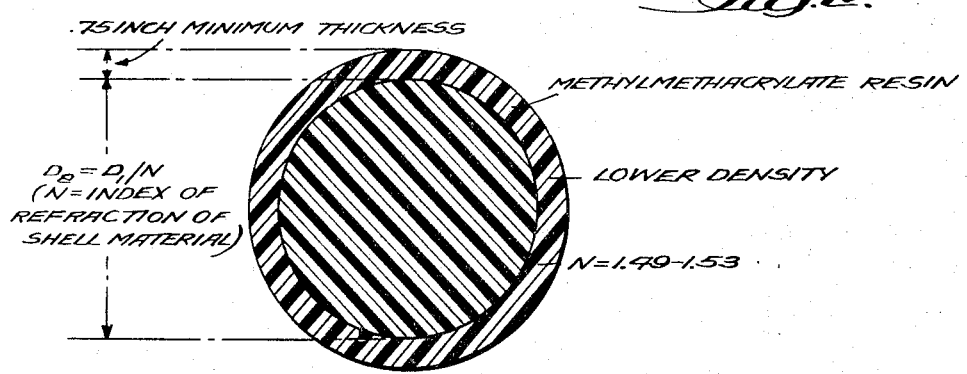
FIG. 2 shows a cross-section of the ball of FIG. 1 taken along line II—II.
Figure 3:
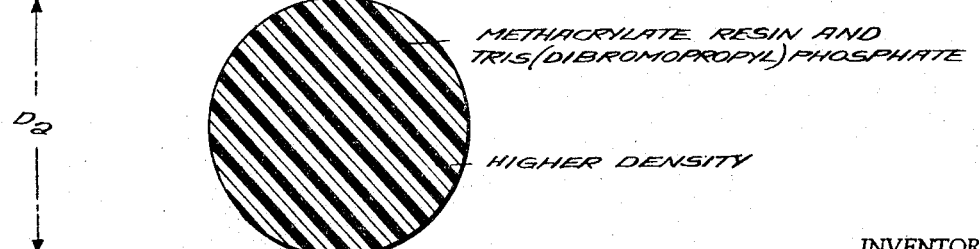
FIG. 3 shows the cross-section of the ball shown in FIG. 2 with the shell material removed to show only the core.

A bowling ball 1 composed of a core 2 of a blend of a standard methacrylate polymer and tris(dibromopropyl) phosphate centered in a shell 3 of a transparent methacrylate polymer with good scratch resistance is constructed as hereinafter described.

The objects of this invention are achieved by means of a substantially methacrylate resin bowling ball having an inner core or center portion of a transparent, relatively high density, substantially methacrylate resin and an outer portion or shell of a standard density methacrylate resin, the shell being contiguous to the entire surface of the core, i.e. there being no voids between the core and the shell, and moreover, the combination of the inner and outer portions being such that complete transparency in the bowling ball is realized. More particularly, it has been discovered that transparent methacrylate resin bowling balls in the approximately 14 to 16 lb. range can be produced by utilizing a transparent substantially methacrylate resin core having a relatively high density and an outer shell of transparent methacrylate resin of standard density. The substantially methacrylate resin core is comprised of a blend of greater than 50 weight percent of a standard methacrylate resin and less than 50 weight percent of tris(dibromopropyl)phosphate. In order to achieve the desired ball weight in the approximately 14 to 16 lb. range, the amount of the tris(dibromopropyl)phosphate may be varied. However, the maximum amount which is required is 40 weight percent based on the mixture of tris(dibromopropyl)phosphate and the methacrylate resin. By varying the amount of the tris(dibromopropyl)phosphate up to the 40 percent level, the density of the substantially methacrylate resin can be varied within the range of about 1.18 grams/cc., the approximate value for the standard methacrylate resin, to about 1.54 grams/cc., the approximate value for the 60/40 methacrylate resin/tris(dibromopropyl)phosphate mixture. It further has been discovered as part of this invention that if the core or center section is fabricated so as to provide a given minimum diameter, the core or center section is not visible through the outer shell of the ball. The minimum diameter of the core may be calculated by means of the equation $D_2 = D_1/N$, where $D_2$ is the diameter of the core, $D_1$ is the diameter of the bowling ball (8.5 inches, with tolerances, according to American Bowling Congress specifications) and $N$ is the index of refraction of the methacrylate resin forming the shell or outer section of the ball. For a standard diameter ball having a methacrylate resin shell whose refractive index is 1.51, the minimum diameter of the core is about 5.6 inches.

Although a transparent bowling ball can be produced from a homogeneous mixture of the tris(dibromopropyl) phosphate and the methacrylate resin, it has been noted that the phosphate ester exerts a deleterious influence upon the base properties of the methacrylate resin. For example, there is a reduction in hardness and an increase in the susceptibility to scratching and abrasion under the conditions normally encountered in the utilization of a bowling ball. As a result it is essential, at least when such phosphate ester-methacrylate resin blends contain in excess of 15 weight percent of the phosphate ester, that the core-shell principle be employed. The decrease in hardness and scratch resistance in compositions containing up to 15 weight percent of the phosphate ester is slight, and hence, if desired, such homogeneous blends can be utilized for the fabrication of a transparent substantially methacrylate resin bowling ball without utilization of the core-shell principle. For maximum hardness and scratch resistance, however, it is preferred that the principle of this invention be used in the fabrication of all bowling balls in the approximately 14 to 16 lb. range. For balls not exceeding about 16 lbs. in weight and complying with the A.B.C. specification diameter of about 8.5 inches, the minimum thickness of the methacrylate resin shell is about 0.75 inch. By means of the principle of this invention, therefore, it is possible to extend the use of the transparent methacrylate resins to encompass the higher weights often required for bowling balls.

In order to produce the bowling balls of this invention a multi-step process must be used. The high density core is fabricated in one operation after which it is embedded in an outer shell of methacrylate resin. To produce the core the mixture of tris(dibromopropyl)phosphate and the methacrylate resin, of previously determined composition which provides the desired weight of bowling balls, is polymerized in a suitable mold employing a conventional methacrylate polymerization catalyst. If desired, suitable dyes or pigments may be added to this mixture before polymerization. Moreover, the polymerization can be conducted in stages, that is, the mold partially filled during the first polymerization stage, with the filling of the mold being completed during a second or subsequent polymerization stage. Following the complete curing of the substantially methacrylate core, it may be embedded in a shell of methacrylate resin in two steps. The shell mold of suitable diameter is partially filled with the methacrylate resin which is to comprise the shell of the bowling ball. It has been found advantageous to utilize a monomer-polymer mixture for the shell, and preferably a mixture containing 50–60 weight percent polymer. The shell mold is filled with the monomer polymer mixture to a level which will provide proper centering of the core within the bowling ball. The monomer-polymer mixture is then polymerized to such a stage that it will support the weight of the substantially methacrylate resin core. When this degree of polymerization has been achieved, the core is placed upon the hardened supporting methacrylate resin, the remainder of the shell mold is filled with monomer-polymer sirup and polymerization is effected as before, employing conventional techniques.

The core and shell of the bowling ball may be formed from any suitable methacrylate resin. A methyl methacrylate resin, because of its ready availability and relatively low cost, has been found to be especially suitable in the present invention. It has been noted that the hardness and scratch resistance of the methacrylate shell or outer section of the bowling ball can be enhanced further by the incorporation of methacrylate cross-linking agents. Such cross-linking agents, are generally the methacrylate esters of polyfunctional alcohols. Examples of such compounds include ethylene glycol dimethylacrylate, trimethylolpropane trimethacrylate and triethylene glycol dimethacrylate. The first of these has been found to be particularly effective in the present invention, especially at the 5–10 weight percent level. It further has been observed in the present invention that suitable precautions must be taken in order to preclude the formation of a void between the core or center section and the outer section or shell. Such voids are formed because of the difference in coefficient of thermal expansion between the resin comprising the core and that used for the shell. Such voids are particularly evident when the polymerization of the monomer-polymer mixture used for the shell is conducted rather slowly and at low temperatures. In order to avoid the formation of voids between the core and the outer section or shell, the polymerization of the monomer-polymer mixture around the core should be conducted at elevated temperatures so that polymerization is effected before a substantial amount of heat is conducted to the preformed core. In the present invention it has been found that voids are minimized or avoided completely by conducting the first stage of the polymerization at about 90° C. until a major portion of the polymerization has been effected, after which time the temperature is reduced to approximately room temperature and the polymerization is completed. Post-curing of both the core and shell generally is carried out at elevated temperatures.

Although the present invention is especially suited to the production of bowling balls, it is obvious that the principle can be utilized in the fabrication of many objects from substantially methacrylate resins where it is desired to achieve within dimensional limitations a weight greater than that permitted by the standard density of the methacrylate resin and where complete transparency is a prerequisite. For example, transparent duckpin balls, likewise, may be produced by this invention. If the article has a non-uniform shape, as a result of which, the distance from its center to its periphery is variable, the minimum core diameter must be determined with respect to the various diameters of the article in order to achieve transparency in all directions, in which case the minimum diameter in any one direction is calculated from the equation $D_2 = D_1/N$ where $D_1$ is one of the diameters of the article in which complete transparency is desired, $D_2$ is the minimum diameter of the core measured along the same axis as $D_1$ and N is the index of refraction of the methacrylate resin forming the shell of the article. Alternatively, it may be said that $D_1/D_2$=the refractive index of the methacrylate resin forming the shell of the article, which for most conventional methacrylate resins is in the range 1.49–1.53, or about 1.51. Hence, the ratio of $D_1/D_{2(minimum)}$ will lie in the range of 1.49–1.53, or about 1.51. The absolute ratio of $D_1/D_2$ thus will be in range of about 1.00 to about 1.51. The actual ratio chosen will of course, be determined by the desired weight of the article and/or the use to which it will be put. For example, if the article is to be subjected to abrading conditions, the lower limit will be controlled by the minimum thickness required to achieve the necessary abrasion resistance. The following example is included as being merely representative of the present invention and in no way is intended to limit this invention.

To an 8-liter stainless steel beaker is added 230 g. of tris(dibromopropyl)phosphate and 3,000 g. of a methyl methacrylate monomer-polymer sirup having a bulk viscosity of 15 poises, an inherent viscosity of 0.35, and a 32.5% conversion of monomer. The mixture is agitated until a homogeneous solution is achieved. If desired, a dye or pigment may be added to provide color. To the mixture is added 5.0 g. of methyl ethyl ketone peroxide and 2.5 g. of a catalyst promoter. After additional stirring to distribute the catalyst and promoter the mixture is poured into a 3-liter glass round-bottomed flask which has been treated previously with a suitable mold release agent. The flask is then covered loosely with aluminium foil and placed in an autoclave at 25° C. under 90 p.s.i. of nitrogen. After 10 to 16 hours the flask is removed from the autoclave and heated for 2 to 4 hours at 90° C. The glass is then broken away from the core and if desired, the core is sanded to remove any rough spots on its outer surface. As indicated hereinabove, the core may be fabricated in a plurality of stages rather than in a single operation as described in this example.

To a 1-liter stainless steel beaker is added 25.0 g. of ethylene dimethacrylate, 175 g. of methyl methacrylate, 0.004 g. of hydroquinone (25 p.p.m.), 0.50 g. of methyl ethyl ketone peroxide and 0.11 g. of a polymerization accelerator. Once again, if desired, an appropriate dye or pigment may be added. To the mixture is added 300 g. of a methyl methacrylate bead polymer. When a homogeneous mixture or dough of suitable viscosity is achieved, it is cast into the bottom half of 9.25 in. two-piece spherical mold to a depth of 1.25 in. and allowed to stand at ambient conditions for 16 hours to yield a polymeric support section for the core. The previously prepared high density core is then placed on the dough and centered with respect to the outside diameter of the mold, i.e. it is placed in a position so that it will be maintained in a spaced relationship with respect to the periphery of the two-piece spherical mold. Monomer-polymer sirup is then placed around the core and the filling aperture of the mold is taped over. The aforesaid monomer-polymer sirup is prepared by mixing in an 8-liter stainless steel beaker 1,575 g. of methyl methacrylate, 225 g. of ethylene dimethacrylate, 0.04 g. of hydroquinone (25 p.p.m.), 4.6 g. of methyl ethyl ketone peroxide and 1.0 g. of a polymerization accelerator. If the core and core support section are colored, an appropriate dye or pigment is added in a requisite amount to match said color. Then 2700 grams of methyl methacrylate bead polymer are added with stirring until the desired viscosity is reached. The completely filled spherical mold is allowed to stand at ambient conditions for at least 5 hours and is then transferred to an autoclave. The temperature is maintained at 90° C. under 100 p.s.i. of nitrogen for 1 hour after which time the temperature is reduced to 28° C. and held for an additional 15 hours while maintaining the nitrogen pressure at 100 p.s.i. The mold is then removed from the autoclave and post-curing is effected for 2 hours at 90° C. After cooling to room temperature the bowling ball is removed from the mold. Suitable sanding and milling may be effected in order to provide the requisite ball dimension.

In the above example the material which has been designated a "catalyst promoter" is a stable homogeneous solution which itself is formed by combining a solution of 16.66 parts by weight of N,N-dibutyl-β-phenylethylamine hydrochloride in an equal weight of chemically pure methanol and a solution of 2.48 parts by weight of stannous chloride dihydrate dissolved in 64.20 parts by weight of propylene glycol. That which has been referred to hereinabove as a "polymerization accelerator" is a methanolic solution containing 20 weight percent antimony trichloride and 0.6 weight percent cuprous chloride. The methyl methacrylate bead polymer is a conventional commercial type polymer commonly used for making embedments and dental castings. By the term "methyl methacrylate resins" is meant homopolymers of methyl methacrylate and copolymers containing bound units of methyl methacrylate and up to 15 weight percent of a vinyl monomer copolymerizable therewith, said homopolymers and copolymers being of sufficient molecular weight to produce a solid, hard resin. The methacrylate resins disclosed herein encompass not only the methyl methacrylate resins just described but, also, homopolymers and copolymers formed from a methacrylate monomer which is an ester of methacrylic acid and an aliphatic alcohol having up to about eight carbon atoms.

I claim:
1. A spherical bowling ball having:
   (1) a core consisting essentially of a blend of a methacrylate resin and tris (dibromopropyl) phosphate, said blend of said core containing in excess of 15 weight percent of said phosphate but no greater than 40 weight percent of said phosphate; and
   (2) a transparent shell consisting essentially of a methacrylate resin and having a density substantially lower than the density of said core, the characteristics of said core and shell being such that the outline of said core is not visible through said shell.
2. The bowling ball of claim 1 wherein the minimum diameter of said core is defined by the relationship $D_2 = D_1/N$, $D_2$ is the minimum diameter of the core measured along the same axis as $D_1$, $D_1$ is a diameter of said bowling ball and $N$ is the index of refraction of said shell.
3. The bowling ball of claim 2 in which said core is transparent.
4. The bowling ball of claim 2 wherein said $N=1.49$ to 1.53.
5. The bowling ball of claim 4 wherein said shell has a minimum thickness of .75 inch.
6. The bowling ball of claim 2 wherein said bowling ball complies with the American Bowling Congress specification of about 14 lbs. to about 16 lbs. with a diameter of about 8.5 inches.
7. The bowling ball of claim 6 wherein said $N=1.49$ to 1.53.

References Cited
UNITED STATES PATENTS

| | | | |
|---|---|---|---|
| 3,207,514 | 9/1965 | Vickery | 273—63 |
| 3,265,392 | 8/1966 | Degner et al. | 273—63 |

RICHARD C. PINKHAM, *Primary Examiner.*

ANTON O. OECHSEL, *Examiner.*

G. J. MARLO, *Assistant Examiner.*